US010262358B2

(12) United States Patent
Oshry et al.

(10) Patent No.: US 10,262,358 B2
(45) Date of Patent: Apr. 16, 2019

(54) MERCHANT CONTINUITY CORRECTION USING CARDHOLDER LOYALTY INFORMATION

(71) Applicant: MasterCard International Incorporated, Purchase, NY (US)

(72) Inventors: Steve Oshry, Bronxville, NY (US); Justin Xavier Howe, Oakdale, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 892 days.

(21) Appl. No.: 13/875,803

(22) Filed: May 2, 2013

(65) Prior Publication Data
US 2014/0330690 A1 Nov. 6, 2014

(51) Int. Cl.
*G06Q 40/00* (2012.01)

(52) U.S. Cl.
CPC ................... *G06Q 40/00* (2013.01)

(58) Field of Classification Search
CPC ............ G06Q 30/02; G06Q 30/0601; G06Q 30/0224; G06Q 30/0226; G06Q 20/10; G06Q 20/40; G06Q 40/00; G06Q 40/02; G06Q 20/4016
See application file for complete search history.

(56) References Cited

U.S. PATENT DOCUMENTS

| 8,219,550 B2 | 7/2012 | Merz et al. | |
|---|---|---|---|
| 2009/0228365 A1* | 9/2009 | Tomchek | G06Q 10/00 705/21 |
| 2011/0137928 A1* | 6/2011 | Engle | G06Q 40/123 707/769 |
| 2011/0178849 A1* | 7/2011 | Rane | G06Q 30/0202 705/7.31 |
| 2014/0316960 A1* | 10/2014 | Katepally | G06Q 40/02 705/35 |

OTHER PUBLICATIONS

U.S. Appl. No. 13/791,078, Lo Faro, et al., filed Mar. 8, 2013.

* cited by examiner

*Primary Examiner* — Kirsten S Apple
*Assistant Examiner* — Mike Anderson
(74) *Attorney, Agent, or Firm* — Budzyn IP Law, LLC

(57) ABSTRACT

A computer-implemented method of maintaining continuity of transaction data associated with a merchant within a payment card network includes identifying new merchant IDs and associated new merchant information from a database, the new merchant IDs and associated new transactions generated after a predetermined timestamp; and identifying discontinued merchant IDs and associated discontinued merchant information from the database, the discontinued merchant IDs associated only with older transactions generated before the predetermined timestamp and thus appearing to have been discontinued after the predetermined timestamp. The method further includes linking a new merchant ID to a discontinued merchant ID based on continued loyalty of payment card holders, the linked pair of new merchant and discontinued merchant ID having common payment card accounts associated therewith, thereby maintaining continuity of transaction data associated with the merchant corresponding to the linked pair of new and discontinued merchant IDs.

12 Claims, 4 Drawing Sheets

| Acct. No. | OLD_ID | DBA NAME | MCC | ADD-CITY | NEW_ID | DBA NAME | MCC | ADD-CITY | NO. OF COMMON_ACCTS |
|---|---|---|---|---|---|---|---|---|---|
| A | OLD_MER1 | OM1 | # | OADD1 OCI1 | NEW_MER1 | NM1 | # | NADD1-NCI1 | 1 |
| | OLD_MER1 | | | | NEW_MER2 | NM2 | # | NADD2-NCI2 | 1 |
| | OLD_MER1 | | | | NEW_MER3 | NM3 | # | NADD3-NCI3 | 1 |
| | *OLD_MER2 | OM2 | # | OADD2 OCI2 | NEW_MER1 | NM1 | # | NADD1-NCI1 | 2 |
| | OLD_MER2 | | | | NEW_MER2 | NM2 | # | NADD2-NCI2 | 1 |
| | OLD_MER2 | | | | NEW_MER3 | NM3 | # | NADD3-NCI3 | 1 |
| B | *OLD_MER2 | OM2 | # | OADD2 OCI2 | NEW_MER1 | NM1 | # | NADD1-NCI1 | 2 |
| | OLD_MER3 | OM3 | # | OADD3 OCI3 | NEW_MER1 | | | | 1 |

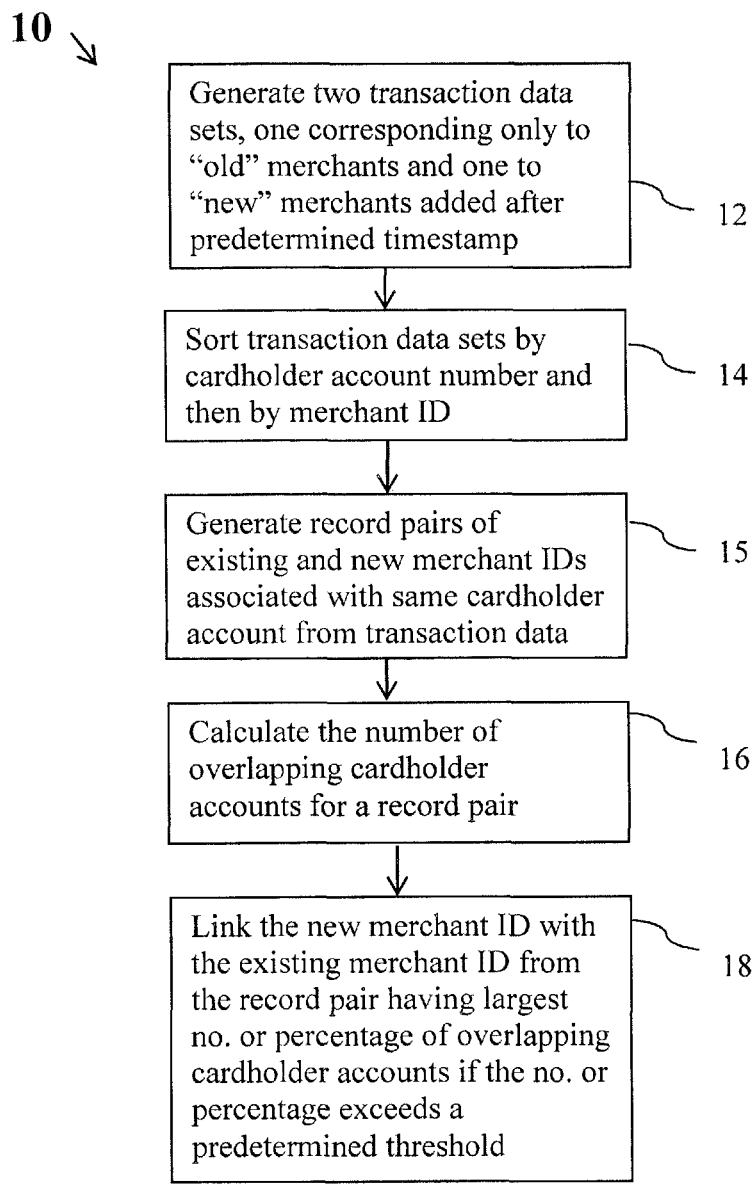

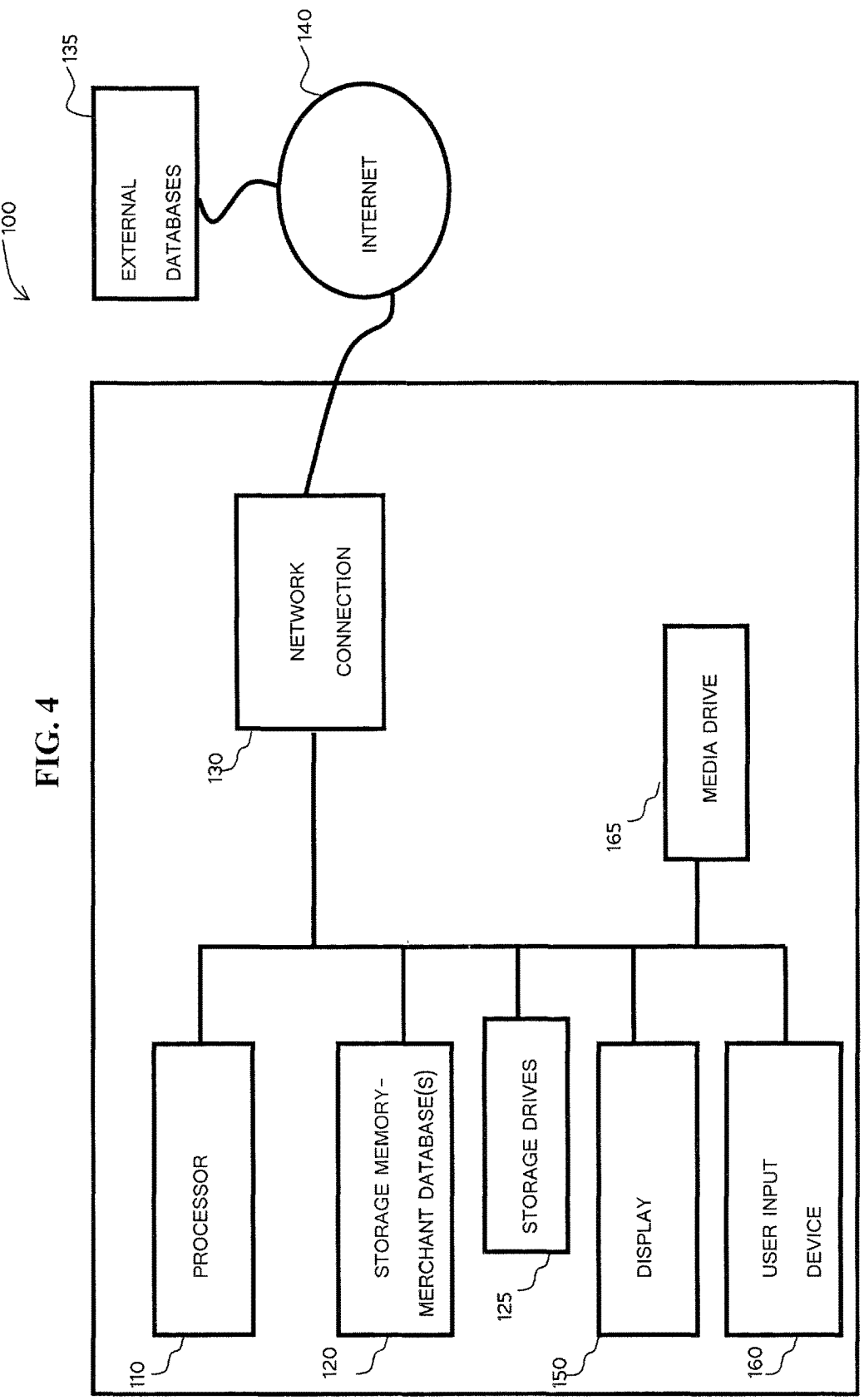

US 10,262,358 B2

MERCHANT CONTINUITY CORRECTION USING CARDHOLDER LOYALTY INFORMATION

FIELD OF THE DISCLOSURE

The present disclosure relates to payment card networks, and, more particularly, to a method for maintaining continuity of transaction data for merchants participating in a payment card network.

BACKGROUND

Payment card networks receive transaction data from millions of merchants worldwide and need to ensure the continuity of merchant information over time in order to maintain the reliability of such data. This can be a difficult task, in that merchant continuity, or continuous proper identification of a merchant associated with payment card transaction data, is often damaged when merchants change acquirers, upgrade terminals, or move locations. Various so-called cleansing routines are commonly used by most payment card networks to address this issue. While many such cleansing routines are known in the art, they are computationally intensive and inefficient, and focus primarily on differences in the various name, location and other data associated with the merchants in order to identify changes in merchant information that disrupt the continuity of transaction data acquired for a particular merchant. None to date has exploited the linkage data inherent in cardholder loyalty to address this continuity of merchant data issue.

There is a continuing need in the art for methods of ensuring continuity of transaction data for merchants participating in a payment card network.

SUMMARY

The present disclosure provides a method and system for ensuring continuity of transaction data for merchants participating in a payment card network.

In accordance with one aspect, a method of maintaining continuity of transaction data associated with a merchant within a payment card network includes providing a database of merchant data, which includes a plurality of merchant IDs and associated merchant information, and is stored on a storage device and accessed by a processing device. The method further includes providing, by the processing device, transaction data associated with a plurality of transactions between a plurality of payment card accounts and the plurality of merchant IDs within a payment card network; identifying, by the processing device, a plurality of new merchant IDs and associated new merchant information from the database, the new merchant IDs being associated with new transactions from the plurality of transactions, the new merchant IDs and the new transactions being generated after a predetermined timestamp; identifying, by the processing device, a plurality of discontinued merchant IDs and associated discontinued merchant information from the database, the discontinued merchant IDs being associated with older transactions from the plurality of transactions and not with any of the plurality of transactions generated after the predetermined timestamp, the discontinued merchant IDs and the older transactions being generated before the predetermined timestamp; and linking, by the processing device, a first new merchant ID from the plurality of new merchant IDs to a first discontinued merchant ID from the plurality of discontinued merchant IDs based on continued loyalty of payment card holders associated with the plurality of payment card accounts to a merchant corresponding to the first discontinued merchant ID, thereby maintaining continuity of transaction data associated with the merchant.

In an additional aspect, the method can further include forming, by the processing device, a plurality of pairs of merchant IDs from the plurality of merchant IDs based on the transaction data, the pairs each comprising one of the plurality of new merchant IDs and one of the plurality of discontinued merchant IDs associated with common payment card accounts from the plurality of payment card accounts, the first pair of the plurality of pairs of merchant IDs comprising the first new merchant ID and the first discontinued merchant ID; and determining a correlation score associated with each of the plurality of pairs, the correlation score corresponding to a correlation between the one of the new merchant IDs and the one of the discontinued merchant IDs in a corresponding one of the plurality of pairs. The linking step comprises linking the first new merchant ID to the first discontinued merchant ID in response to the correlation score associated with the first pair exceeding a predetermined threshold.

In yet another aspect, the method can further include sorting the plurality of pairs in descending order according to the correlation score calculated for each of the plurality of pairs; where the linking step includes linking the plurality of pairs of merchant IDs in the descending order according to the correlation score.

In still a further aspect, the method further includes: determining a new transaction ratio associated with each of the plurality of pairs of merchant IDs, the new transaction ratio corresponding to a number of new transactions associated with the new merchant ID in the corresponding pair to a total number of transactions associated with the corresponding pair; determining an older transaction ratio associated with each of the plurality of pairs of merchant IDs, the older transaction ratio corresponding to a number of older transactions associated with the discontinued merchant ID in the corresponding pair to the total number of transactions associated with the corresponding pair; and calculating the score as a product of the new transaction ratio and the older transaction ratio associated with each of the plurality of pairs.

In particular aspects, the older transactions correspond to transactions occurring within a preset first time interval and the new transactions correspond to transactions occurring within a preset second time interval, the method further including calculating a new time interval ratio corresponding to a ratio of the preset second time interval to a sum of the preset second time interval and the preset first time interval, the linking step comprising linking the first new merchant ID to the first discontinued merchant ID in response to the new transaction ratio associated with the first pair exceeding the new time interval ratio.

In one aspect, the correlation score calculated for the first pair is a highest score, the first pair being a highest ordered one of the plurality of pairs of merchant IDs, the method further including: storing the plurality of pairs in the descending order in a table before the linking step; and removing from the table each of a lower ordered pair that includes either one of the first new merchant ID and the first discontinued merchant ID in response to the linking of the highest ordered one of the plurality of pairs of merchant IDs, the lower ordered pair having a lower score than the highest score.

In an additional aspect, the method can further include removing from the table a selected one of the plurality of pairs before the linking step in response to selected statistical data associated with the selected one being less than a predetermined threshold number.

In various further aspects, the selected statistical data can include one or more of: a number of the common payment card accounts associated with the selected one of the plurality of pairs; a ratio of the number of the common payment card accounts associated with the selected one of the plurality of pairs to a number of the plurality of payment card accounts associated with the new merchant ID in the selected one of the plurality of pairs; a ratio of the number of the common payment card accounts associated with the selected one of the plurality of pairs to a number of the plurality of payment card accounts associated with the discontinued merchant ID in the selected one of the plurality of pairs; a new transaction ratio associated with the selected one of the plurality of pairs, the new transaction ratio corresponding to a number of new transactions associated with the new merchant ID in the selected one of the plurality of pairs to a total number of transactions associated with the selected one of the plurality of pairs; an older transaction ratio associated with the selected one of the plurality of pairs, the older transaction ratio corresponding to a number of older transactions associated with the discontinued merchant ID in the selected one of the plurality of pairs to the total number of transactions associated with the selected one of the plurality of pairs; a total number of transactions associated with the selected one of the plurality of pairs; a total number of new transactions associated with the new merchant ID of the selected one of the plurality of pairs; and/or a total number of older transactions associated with the discontinued merchant ID of the selected one of the plurality of pairs.

In addition to the above aspects of the present disclosure, additional aspects, objects, features and advantages will be apparent from the embodiments presented in the following description and in connection with the accompanying drawings.

BRIEF DESCRIPTION OF THE DRAWINGS

FIG. 1 is a flow diagram representation of an embodiment of a method of the present disclosure for maintaining continuity of transaction data for merchants participating in a payment card network.

FIG. 4 is a schematic representation of an embodiment of a system for implementing various embodiments of the methods of the present disclosure.

DETAILED DESCRIPTION OF THE EMBODIMENTS

Figures 2A, 2B, 2C:
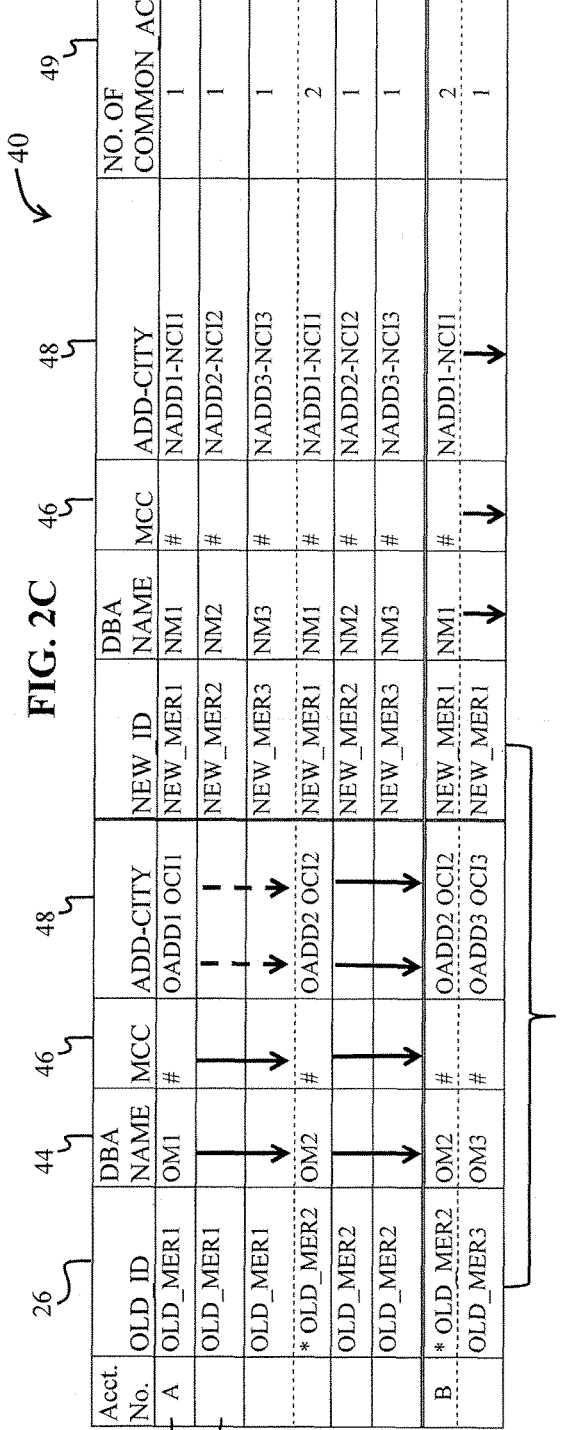
FIGS. 2A, 2B and 2C are schematic representations of tables generated in accordance with the embodiment of FIG. 1.

The following sections describe particular embodiments. It should be apparent to those skilled in the art that the described embodiments provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present method and system as defined herein and equivalents thereto.

Throughout the description, where items are described as having, including, or comprising one or more specific components, or where methods are described as having, including, or comprising one or more specific steps, it is contemplated that, additionally, there are items of the present disclosure that consist essentially of, or consist of, the one or more recited components, and that there are methods according to the present disclosure that consist essentially of, or consist of, the one or more recited processing steps.

It should also be understood that the order of steps or order for performing certain actions is immaterial, as long as the method remains operable. Moreover, two or more steps or actions may be conducted simultaneously.

The term "transaction data" is used herein to refer to data associated with any recorded transaction, including any transaction using a payment card, for example, a credit card, debit card, PIN debit card, ATM card, electronic funds transfer (EFT), near field communications (NFC) payments, smartphone wallet transactions, and so on, as well as those electronic payments using ACH and electronic wire.

The term merchant identifier, also referred to herein as "merchant ID", can refer to a merchant name, a merchant phone number, an acquiring merchant identifier, a tier merchant identifier, a merchant legal name, a federal tax identifier, or any other identifier for uniquely identifying and referring to a merchant entity.

The present disclosure is directed to a method and system for maintaining continuity of transaction data for merchants associated with a payment card network.

Payment card issuers in a payment card network typically maintain a database of merchants associated with payment card transactions, along with data associated with those transactions, within the payment card network. One difficulty in obtaining useful data for each merchant is in accurately identifying the merchant from a transaction record. Such records may have missing merchant information, or variations in a merchant's name or address information, for example, that make it difficult to accurately identify the merchant. As a result, transactions that are associated with the same merchant entity may be erroneously distributed among a number of different merchant identifiers (also referred to as "merchant IDs") in the payment card issuer's merchant database, as appearing to be associated with different merchant entities. To maintain continuity of transaction data associated with a merchant, or "merchant continuity," the correct merchant entity must be consistently identified from transaction records, i.e., from records of payment card transactions between cardholders and merchants.

Generally, merchant continuity is broken when a merchant associated with an existing merchant ID in the database changes some aspect associated with the ID, such as its acquirer, terminal, or address, such that payment card transactions associated with the merchant that occur after the change are no longer associated with the existing merchant ID. Instead, transactions occurring after the time the change was implemented are erroneously associated with a newly created merchant ID associated with the changed information. Simultaneously, no new transactions after the time of the change are recorded for the existing merchant ID, which appears to be discontinued after the particular time.

The present method exploits a cardholder's tendency to return to the same stores to make purchases, in order to identify an erroneously generated new merchant ID, which actually corresponds to an existing merchant in the database. The new merchant ID is thus erroneously disassociated from the proper existing merchant ID in the database, and must be linked to the existing merchant ID in the database in order to ensure continuity of transactional data for the merchant.

Each record of payment card transactions received by the payment card issuer includes at least a date and time of the transaction, an account number of the cardholder making the purchase, a merchant name, and merchant location information associated with the transaction, along with financial details of the purchase. Various methods known in the art, for example, using string matching algorithms, such as disclosed in commonly assigned U.S. Pat. No. 8,219,550, issued 10 Jul. 2012 to Merz, et al., ("Merz"), which is incorporated herein in its entirety by reference, can be used to initially determine whether the merchant name and location information in a transaction record match an existing merchant name in the database. Each transaction record that contains merchant data considered to be a match to an existing merchant in the database is associated with a corresponding existing merchant ID. If a match is not identified, the transaction record is assigned a new merchant ID.

Referring to FIG. 1, in one embodiment 10, a method for maintaining continuity of merchant data includes generating from the payment card transactions received, a first set of payment card transaction records occurring for a period of time prior to and including a predetermined timestamp (date and time), and a second set of transaction records occurring after the predetermined timestamp 12, and, preferably, within some predetermined interval of time after the predetermined timestamp 12.

The two sets of transaction data are then preferably compared and further filtered to identify all transactions associated with a new merchant ID (an ID generated after the predetermined timestamp) and its associated new merchant location data and/or address. These transactions are referred to herein as "new transactions." A listing of "new merchants" corresponding to the new merchant addresses and IDs can then be generated, which appear to begin showing volume or activity for the first time after the timestamp cutoff, and, thus, have been assigned new merchant ID numbers. Similarly, transactions corresponding to a listing of "old merchants" can be generated, where old, or discontinued, merchants correspond to pre-existing merchant IDs associated with transactions occurring prior and up to the cutoff timestamp, but not seen listed in any new transactions. The transactions associated with these discontinued merchants are referred to herein as "old transactions."

It will be appreciated by those skilled in the art that sets of "old" and "new" transactions and "old" (or "discontinued") and "new" merchants as defined herein, as well as the timestamp and intervals of time for evaluating them can be redefined for repeating the methods described herein, as the most current transactional data is continuously retrieved and evaluated. In one embodiment, for example, the number of days in the predetermined interval of time after the predetermined timestamp is expanded as time progresses, and additional "new" merchants, as well as "old" discontinued merchants for which activity ceases, can be further identified.

Referring to FIG. 1 and FIG. 2A, a listing of transactions 24 associated with old merchants (old transactions) is preferably generated and sorted 14 first by cardholder account number, or personal account number ("PAN") 26 and then by old merchant ID 28 and can be stored in a table 20. Similarly, a listing of transactions 30 associated with new merchants (new transactions) is preferably generated 12 and sorted 14 first by cardholder account number 26 and then by new merchant ID 34 and can be stored in another table 22.

Referring also to FIG. 2C, a linking table 40 for identifying possible matches between certain old (or discontinued) and new merchants based at least in part on cardholder activity can then be generated from this data. Referring also to FIG. 1, for example, by comparing transaction data for old and new merchants, a linking table 40 is generated with a separate record 42 for every pair 43 of old merchant and new merchant (referred to herein as a "record pair") that was visited by the same account holder 15 associated with an account number 26, Account No. A, in this example. Along with the merchant IDs, the records in the linking table 40 preferably include the corresponding merchant "doing business as" or "DBA" names 44, merchant category codes ("MCC") 46, and addresses 48 associated with each old merchant and new merchant in the table 40. Accordingly, the number of records in the linking table 40 for a given account number equals the product of the number of new merchants 34 visited by the account holder and the number of old merchants 28 visited by the account holder.

This information can be generated for each cardholder account number, and is preferably used to generate records of all old merchant/new merchant record pairs 15, along with the number of card account holders who frequented the same pairs 16, according to methods known in the art. For example, the linking table 40 can be generated by retrieving the set of new transactions associated with a first cardholder account number, and then retrieving the set of old transactions associated with the first cardholder account number to build an initial listing of old merchant/new merchant record pairs frequented by the cardholder associated with the first account number as shown in FIG. 2C. The linking table 40 can include additional fields or columns, including the MCC codes 46 and merchant address and/or location data 48. In the same, or a separate table, as additional account holder transactions are retrieved, if a transaction occurred for a new merchant or old merchant ID not already listed in the table 40, the table (or a separate table) can be updated accordingly with various statistics. Where a given record pair already exists in the linking table 40, a transaction match field (not shown, referred to herein as "Txn_Match") can be incremented for the corresponding record pair to indicate the number of transactions recorded for each of the old and new merchant record pairs listed in the table 40. Simultaneously, for each old merchant/new merchant record pair, a counter can be incremented to track the number of cardholder accounts that frequented the same pair of existing and new merchants listed in the linking table 40 (referred to herein as "Common_Accounts") 49. Accordingly, a number of overlapping cardholder accounts can be calculated for each record pair 16 in the linking table 40.

In the simple example provided in FIGS. 2A, 2B, and 2C, of the nine total transactions recorded for two accounts, A and B, three old (discontinued) merchants and three new merchants were frequented. Old merchant 2 and 3 ("OLD_MER2", "OLD_MER3") and new merchant 1 ("NEW_MER1") registered two transactions each (Txn_Match equaling 2), while the others registered only one each (Txn_Match for each equaling 1). Only one pair, OLD_MER2 and NEW_MER1 register more than one (i.e., in this example, both A and B accounts) overlapping account or Common_Account 44 (an account which visits both the old merchant and the new merchant comprising one record pair 43 in the linking table 40).

The records generated in accordance with the tables of FIG. 2A and FIG. 2B can be sorted to obtain the linking table 40 shown in FIG. 2C by any appropriate method known in the art.

In one embodiment, the greater the number of overlapping cardholder accounts (Common_Accounts) that are associated with transactions with both merchants in a record pair 43, the greater the correlation between old merchant and new merchant, indicating that the existing merchant entity associated with the old merchant ID may be the same, or may correspond to the same, merchant entity associated with the new merchant ID in the record pair. Accordingly, the number of overlapping accounts can be used as one criterion for determining that a new merchant ID be linked with an old merchant ID to maintain continuity of transaction data for the existing merchant.

Referring again to FIG. 1, in one embodiment, a correlation value or score based on cardholder loyalty (in this embodiment, a number, or percentage, of common accounts) is determined for each of the record pairs, and the merchants in the record pair having the greatest correlation value are linked, preferably, if additional threshold criteria are also met. In particular, for a new merchant ID associated with the same cardholder account as an existing merchant ID in the database (for example, the new merchant ID and existing merchant ID are recorded as a record pair 43 in the linking table 40), the number of overlapping or common accounts 44 associated with transaction data for both merchants 43 in the record pair is determined. The new merchant ID is linked with the existing merchant ID in a record pair having the greatest correlation value, in this embodiment, the greatest number, or percentage, of common accounts 18. Preferably, additional criteria are also applied. For example, the number of accounts must also exceed a predetermined threshold value.

Preferably, the remaining record pairs that include either the same old merchant ID as the now linked accounts are removed from the linking table.

Other criteria and statistics can also be used to increase the reliability of using card holder loyalty as a factor in identifying new merchant IDs that should be linked to existing, discontinued, merchant IDs in the database for continuity of merchant data. In one embodiment, a correlation value or score is calculated for each pair based on cardholder loyalty and the record pairs are ordered in accordance with the correlation score in descending order. Record pairs are linked in accordance with the order, the pair corresponding to the highest score being selected first for linking.

Figure 3:
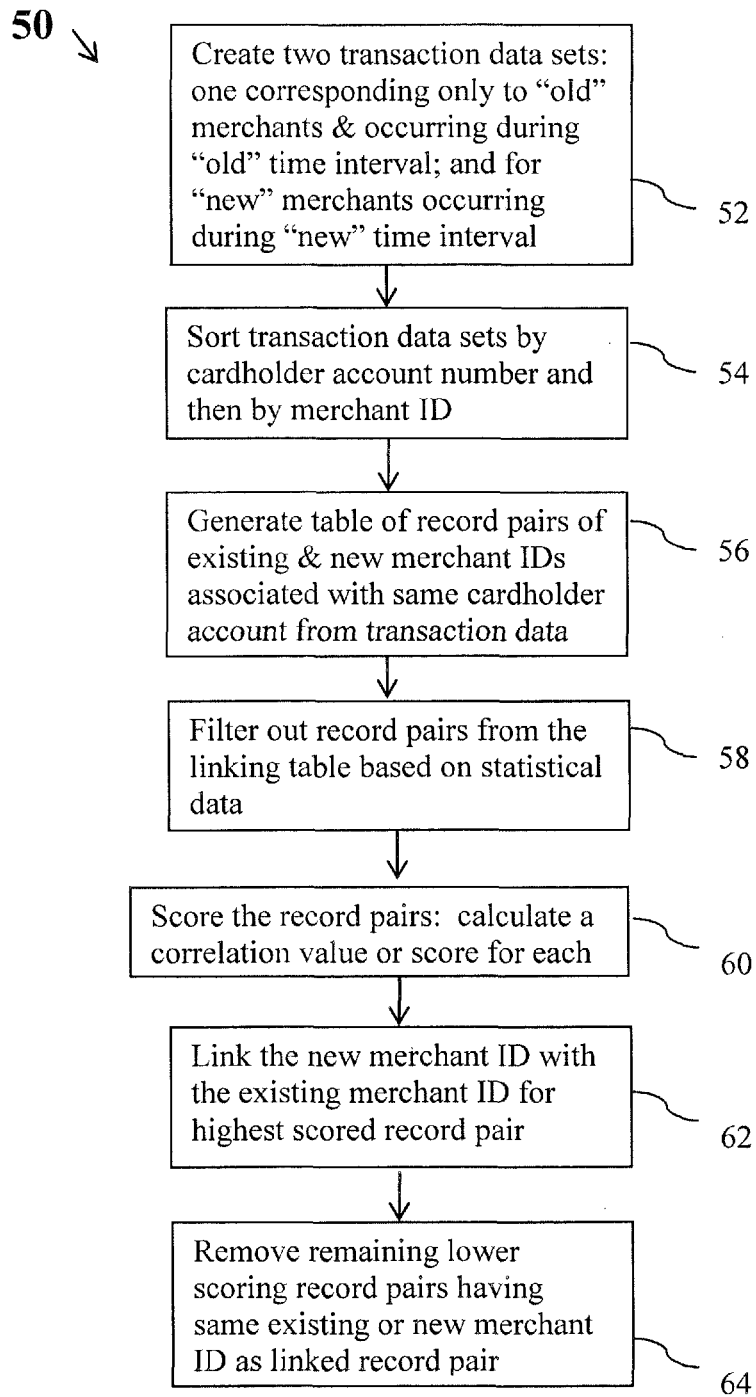
FIG. 3 is a flow diagram representation of another embodiment of a method of the present disclosure for maintaining continuity of transaction data for merchants participating in a payment card network.

In various embodiments, for example, as shown in the embodiment 50 of FIG. 3, before linking any record pair based on cardholder loyalty, various filters can also be applied to remove certain record pairs from linking based on statistics 58 that indicate a lack of sufficient data, or sufficient correlation, to make a reliable determination.

For example, statistics such as the total number of cardholder accounts associated with new transactions for a new merchant (referred to herein as "New_Acct") in the network during the specified time interval after the predetermined timestamp can be tracked and used to filter out record pairs. In one embodiment, a ratio (referred to herein as "New_Acct Ratio") of the number of overlapping cardholder accounts (Common_Accounts) for the record pair to a number of cardholder accounts associated with the new merchant (New_Acct) in a record pair can be calculated as Common_Accounts/New_Accts 16 for each record pair.

Similarly, the total number of cardholder accounts associated with old transactions for a discontinued merchant (referred to herein as "Old_Acct") in the network during a specified interval of time before the predetermined timestamp can be determined. In one embodiment, a ratio (referred to herein as "Old_Acct Ratio") of a number of overlapping cardholder accounts (Common_Accounts) for the record pair to a number of cardholder accounts associated with the discontinued merchant (Old_Acct) in a record pair can be calculated for each record pair 16 as Common_Accounts/Old_Accts.

In various embodiments, these and various other statistics can be generated and applied to the potentially linked record pairs in the linking table to filter out record pairs for which a relationship cannot be reliably determined. For example, if the number of Common_Accounts for a record pair is below a threshold T0, the record pair is removed from the linking table. In additional embodiments, if the Old_Acct Ratio for a record pair is below a predetermined threshold T1, the record pair is removed from the linking table before applying a linking step, so that the old and new merchant IDs in the record pair will not be linked in the merchant database.

Similarly, if the New_Acct ratio for a record pair is below a predetermined threshold T2 (which may or may not be the same as T1), the record pair is removed from the linking table before applying the Common_Accounts threshold, so that the old and new merchant IDs in the record pair will not be linked.

In additional embodiments, a total number of transactions over all cardholder accounts associated with a new merchant is determined (referred to herein as "New_Txns"). In addition, a total number of transactions over all cardholder accounts associated with an old merchant can be determined (referred to herein as "Old_Txns"). A ratio, referred to herein as "New_Txn_Ratio," can be calculated for a particular old (discontinued) and new merchant record pair as the number of new transactions associated with the new merchant in the record pair (New_Txns) to the total number of transactions recorded for the record pair (Txn_Match), or as New_Txns/Txn_Match. Similarly, a ratio, referred to herein as "Old_Txn_Ratio," can be calculated the number of old transactions associated with the discontinued merchant in the record pair (Old_Txns) to the total number of transactions recorded for the record pair (Txn_Match), or as Old_Txns/Txn_Match.

In various embodiments, record pairs of and new merchant IDs and associated data are removed from the linking table before applying the Common_Accounts threshold if the New_Txn_Ratio for a record pair is below a predetermined threshold T3, so that the old and new merchant IDs in the filtered record pair will not be linked in the merchant database.

Similarly, record pairs of old/new merchant IDs and associated data can be removed from the linking table before applying the Common_Accounts threshold if the Old_Txn_Ratio for a record pair is below a predetermined threshold T4, so that the old and new merchant IDs in the filtered record pair will not be linked in the merchant database.

Additional filters can be applied to the data to increase the reliability of using card holder loyalty as a factor in identifying new merchant IDs that should be linked to existing merchant IDs in the database for continuity of merchant data.

For example, in one embodiment, a record pair of old merchant/new merchant is removed from the linking table and not linked in the database if Txn_Match is below a predetermined threshold T5.

In another embodiment, a record pair of old merchant/new merchant is removed from the linking table and not linked in the database if a number of new transactions associated with the new merchant ID in the record pair is below a predetermined threshold T6.

In yet another embodiment, a record pair of old merchant/new merchant is removed from the linking table and not linked in the database if a number of old transactions associated with the old or existing merchant ID in the record pair is below a predetermined threshold T7.

In preferred embodiments, once a new merchant ID is linked to the corresponding old merchant ID in a record pair, all other record pairs in the linking table having either one of the linked new merchant ID or old merchant ID are preferably removed from the linking table.

To ensure that the linked pair is the best possible match of a new merchant ID to an existing merchant ID, in preferred embodiments, a highest scoring record pair is identified for linking, and lower scoring record pairs are then removed from the linking table.

Referring to FIG. 3, in one embodiment of a method of maintaining continuity of merchant data 50 in accordance with the present disclosure, two transaction data sets for existing and new merchants are created for particular time intervals before and after a predetermined timestamp 52 in accordance with the present disclosure. The transaction data sets are sorted by cardholder account number and then by merchant ID 54. The linking table is generated 56, by comparing the old and new transaction data, with record pairs of existing and new merchant IDs associated with the same cardholder account. In various embodiments, any filter or combination(s) of the filters based on statistical data for increasing the reliability of determining a match between an old and new merchant in a record pair, examples of which are provided above, can be applied to filter out record pairs based on statistical data being less than a predetermined threshold 58, indicating insufficient or unreliable transaction data for linking the removed record pairs.

Preferably, the records (i.e., record pairs of old and new merchant IDs with associated merchant data) in the linking table are further sorted in descending order in accordance with a correlation value or score associated with each record pair 60, a higher correlation score corresponding to a higher correlation between the new merchant and old merchant in the corresponding record pair. The sorted and ordered records may be stored in a separate table.

In various embodiments, the correlation value can correspond to the Common_Accounts, or the number of cardholders having transactions with both the old merchant and new merchant in a record pair. The record pair with the highest correlation value, and, preferably, also meeting other threshold requirements, is approved for linking 62. For example, the threshold requirement may include a requirement that the Common_Accounts be greater than a predetermined threshold.

For example, in one embodiment, the correlation score for ordering the record pairs is determined as follows. Old transaction 24 data, as shown, for example, in the table 20 of FIG. 2A, include transactions occurring during an "old time interval" prior and up to the predetermined timestamp. New transaction 30 data include transactions occurring during a "new time interval" after the predetermined timestamp. The number of days included in the old time interval is referred to herein as "Nold," and the number of days included in the new time interval is referred to herein as "Nnew." The correlation score for each record pair can then be calculated as a product of the Old_Txn_Ratio and the New_Txn_Ratio, and the record pairs ordered in descending order in accordance with these calculated correlation scores 60.

The record pairs are then linked in this order 62, if a certain threshold value is met. In one embodiment, if the New_Txn_Ratio is greater than the percentage of new days over the entire measured time interval, i.e., greater than Nnew/(Nold+Nnew), the first (highest scoring) record pair in the linking table is approved for linking 62.

As an entry in the linking table is approved for use in continuity correction, other entries with the same old merchant ID or new merchant ID as listed in the approved record pair, and which have lower correlation values, or scores, in the table, are preferably removed 64.

The methods described herein can be integrated into other known merchant continuity correction systems and methods, such as those using string matching algorithms, as disclosed in the Merz patent, for example, to improve the reliability of such methods. In one embodiment, the methods described herein can also be incorporated into the continuity correction systems and methods described in commonly assigned U.S. Ser. No. 13/791,078 by Lo Faro et al., filed on Mar. 8, 2013, entitled "Recognizing and Combining Redundant Merchant Designations in a Transaction Database," which is incorporated herein in its entirety by reference thereto.

Working Example of an Embodiment of the Present Disclosure

A method for maintaining and correcting continuity of transaction data associated with merchants participating in a payment card network in accordance with the present disclosure is preferably implemented in a continuous efficient manner. For example, if transactions at an old location associated with an old merchant ID stopped a week prior to implementing the method, those historical transactions only need to be compiled once for the subsequent seven days of analysis. Similarly, if a new merchant had transactions today and yesterday, to determine whether the new merchant is linked to an old merchant, it is only necessary to search cardholder accounts associated with transactions seen today to the record.

Some details for applying an incremental perspective for continuous application of the methods described herein can include the following:

Store all results from the prior day's OLD_Location (location associated with old merchant ID) research and NEW_Location (location associated with new merchant ID) research.

For each new day of processing remove all transaction detail from the earliest day in the old merchant dataset.

If an old merchant ID reappears in today's transaction detail, remove that old merchant ID from the old merchant data set.

If a location associated with an old merchant ID had transactions in the prior time period but no transactions today, then gather all of the metrics/accounts from the prior time period and add them to the old merchants file.

If more transactions are seen at a location listed in the new merchants file, then add them to the new merchants file.

If a new merchant appears today with no prior history, add it to the new merchants dataset.

System for Implementing the Methods of the Present Disclosure

Referring to FIG. 4, the various embodiments of the methods of the present disclosure are implemented via computer software or executable instructions or code. FIG. 4 is a schematic representation of an embodiment of a system 100 for implementing the methods of the present disclosure. The system includes at least a processor 110 including a Central Processing Unit (CPU), memory 120, and interface hardware 130 for connecting to external sources of data 135, for example, transaction data associated with merchants in the payment card network, via the Internet 140.

Any of the raw, filtered, or generated tables of transaction and merchant data, and other databases and tables described herein for implementing the methods of the present invention, may also be stored in an external database 135, and accessed remotely, for example, via the Internet or other means, or may be stored in one of a number of local storage devices 125 of the system 100 for implementing the methods of the present disclosure.

Referring still to FIG. 4, the system 100 can be integrated with a computer workstation with display 150 and input keypad or keyboard 160. The memory 120 includes computer readable memory accessible by the CPU for storing instructions that when executed by the CPU 110 causes the processor 110 to implement the steps of the methods described herein. The memory 120 can include random access memory (RAM), read only memory (ROM), a storage device including a hard drive, or a portable, removable computer readable medium, such as a compact disk (CD) or a flash memory, or a combination thereof. The computer executable instructions for implementing the methods of the present invention may be stored in any one type of memory associated with the system 100, or distributed among various types of memory devices provided, and the necessary portions loaded into RAM, for example, upon execution.

In one embodiment, a non-transitory computer readable product is provided, which includes a computer readable medium that can be accessed by the CPU, via a media drive 165, for example, the computer readable medium storing computer executable instructions or program code for performing the method steps described herein. It should be recognized that the components illustrated in FIG. 4 are exemplary only, and that it is contemplated that the methods described herein may be implemented by various combinations of hardware, software, firmware, circuitry, and/or processors and associated memory, for example, as well as other components known to those of ordinary skill in the art.

While the methods and system of the present disclosure have been particularly shown and described with reference to specific embodiments, it should be apparent to those skilled in the art that the foregoing is illustrative only and not limiting, having been presented by way of example only. Various changes in form and detail may be made therein without departing from the spirit and scope of the disclosure. Therefore, numerous other embodiments are contemplated as falling within the scope of the present methods and system as defined by the accompanying claims and equivalents thereto.

What is claimed is:

1. A computer-implemented method of maintaining continuity of transaction data associated with a merchant within a payment card network when continuity is broken due to a change in a merchant ID associated with the merchant, the method comprising:
   (i) providing, by a processing device from an external database via interface hardware, transaction data associated with a plurality of transactions between a plurality of payment card accounts and a plurality of merchant IDs within a payment card network, a payment card being a credit card, a debit card, a PIN debit card, an ATM card, an electronic funds transfer, a near field communication payment, a smartphone wallet transaction, an electronic payment using ACH, or an electronic payment using electronic wire;
   (ii) identifying, by the processing device, a plurality of new transactions from the plurality of transactions generated after a predetermined timestamp, the new transactions being at least in part identifiable by association with merchant IDs from the plurality of merchant IDs designated as new merchant IDs, the new merchant IDs not being associated with any transactions from the plurality of transactions generated prior or up to the predetermined timestamp;
   (iii) identifying, by the processing device, a plurality of older transactions from the plurality of transactions generated prior and up to the predetermined timestamp, the older transactions being at least in part identifiable by association with merchant IDs from the plurality of merchant IDs associated as discontinued merchant IDs, the discontinued merchant IDs not being associated with any transactions from the plurality of transactions generated after the predetermined timestamp;
   (iv) forming, by the processing device for each of the payment card accounts, a plurality of record pairs based on the transaction data, the record pairs each comprising one of the new transactions and one of the older transactions, wherein, the record pairs include combinations of (i) each of the new transactions with (ii) each of the older transactions;
   (v) determining a correlation score based on the number of the payment card accounts containing each of the record pairs thereby determining the number of overlapping payment card accounts which contain the same record pair; and,
   (vi) linking one of the new merchant IDs with one of the discontinued merchant IDs based on the correlation score to establish continuity between the merchant IDs,
   wherein, steps (i) (vi) are repeated based on newly-defined predetermined timestamps, and,
   wherein, with repeating steps (i) (vi), upon identifying at least one new transaction which is based on at least one of the newly-defined predetermined timestamps and which is identified as being associated with a previously-defined discontinued merchant ID, removing the identification as one of the discontinued merchant IDs from the merchant ID associated with the previously-defined discontinued merchant ID.

2. The method of claim 1, further comprising:
determining a new transaction ratio associated with each of the record pairs, the new transaction ratio corresponding to a number of new transactions associated with the new merchant ID in the corresponding record pair to a total number of transactions associated with the corresponding record pair;
determining an older transaction ratio associated with each of the record pairs, the older transaction ratio corresponding to a number of older transactions associated with the discontinued merchant ID in the corresponding record pair to the total number of transactions associated with the corresponding record pair; and
calculating the correlation score as a product of the new transaction ratio and the older transaction ratio associated with each of the record pairs.

3. The method of claim 1, wherein the correlation score calculated for a first record pair is a highest score of the record pairs, the first record pair corresponding to a first new merchant ID and a first discontinued merchant ID, the method further comprising:

storing the record pairs in a table before the linking step; and removing from the table each of the record pairs which (i) has a correlation score lower than the highest score, and (ii) that includes either one of the first new merchant ID and the first discontinued merchant ID.

4. The method of claim 3, further comprising removing from the table a selected one of the record pairs before the linking step in response to selected statistical data associated with the selected record pair being less than a predetermined threshold number.

5. The method of claim 4, wherein the selected statistical data comprises a number of the payment card accounts associated with the selected record pair.

6. The method of claim 4, wherein the selected statistical data comprises a ratio of the number of payment card accounts associated with the selected record pair to a number of the plurality of payment card accounts associated with the new merchant ID corresponding to the selected record pair.

7. The method of claim 4, wherein the selected statistical data comprises a ratio of the number of payment card accounts associated with the selected record pair to a number of the plurality of payment card accounts associated with the discontinued merchant ID corresponding to the selected record pair.

8. The method of claim 4, wherein the selected statistical data comprises a new transaction ratio associated with the selected record pair, the new transaction ratio corresponding to a number of new transactions associated with the new merchant ID corresponding to the selected record pair to a total number of transactions associated with the selected record pair.

9. The method of claim 4, wherein the selected statistical data comprises an older transaction ratio associated with the selected record pair, the older transaction ratio corresponding to a number of older transactions associated with the discontinued merchant ID corresponding to the selected record pair to the total number of transactions associated with the selected record pair.

10. The method of claim 4, wherein the selected statistical data comprises a total number of transactions associated with the selected record pair.

11. The method of claim 4, wherein the selected statistical data comprises a total number of new transactions associated with the new merchant ID corresponding to the selected record pair.

12. The method of claim 4, wherein the selected statistical data comprises a total number of older transactions associated with the discontinued merchant ID corresponding to the selected record pair.

* * * * *